UNITED STATES PATENT OFFICE.

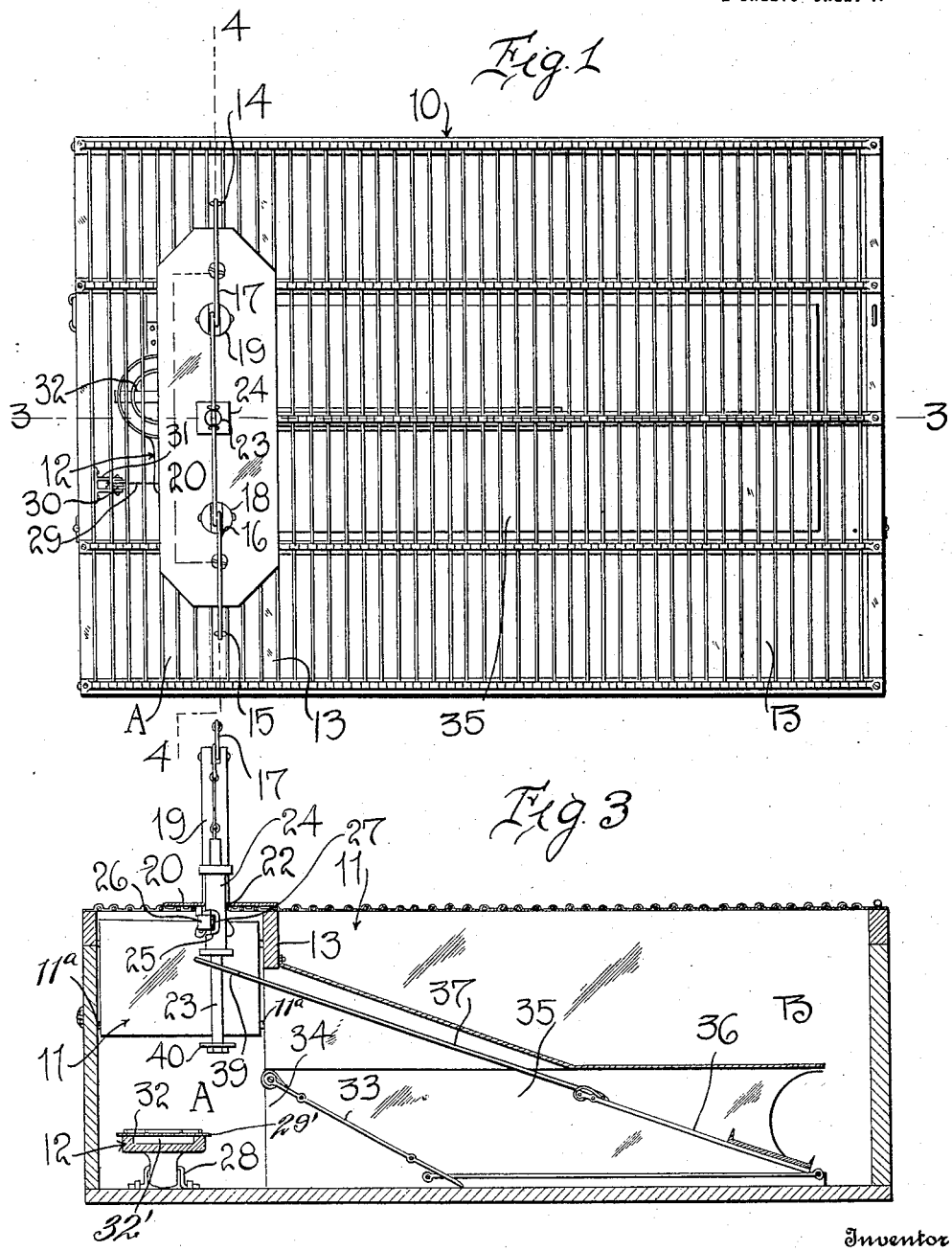

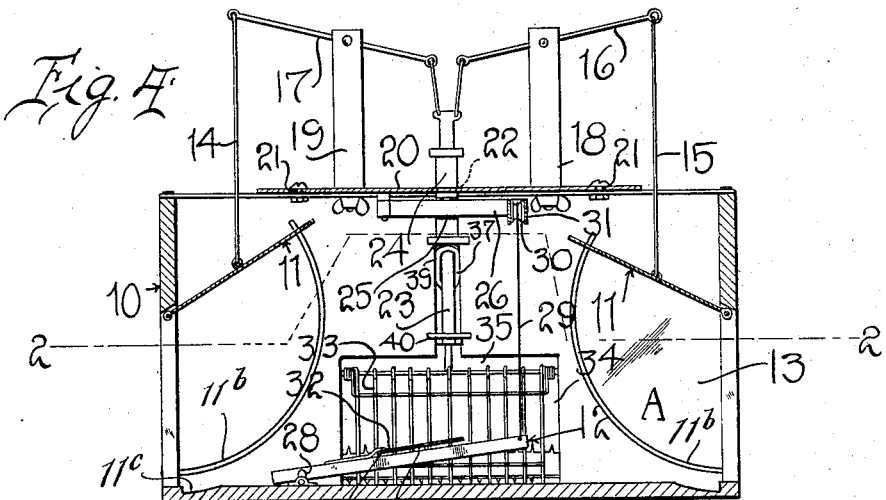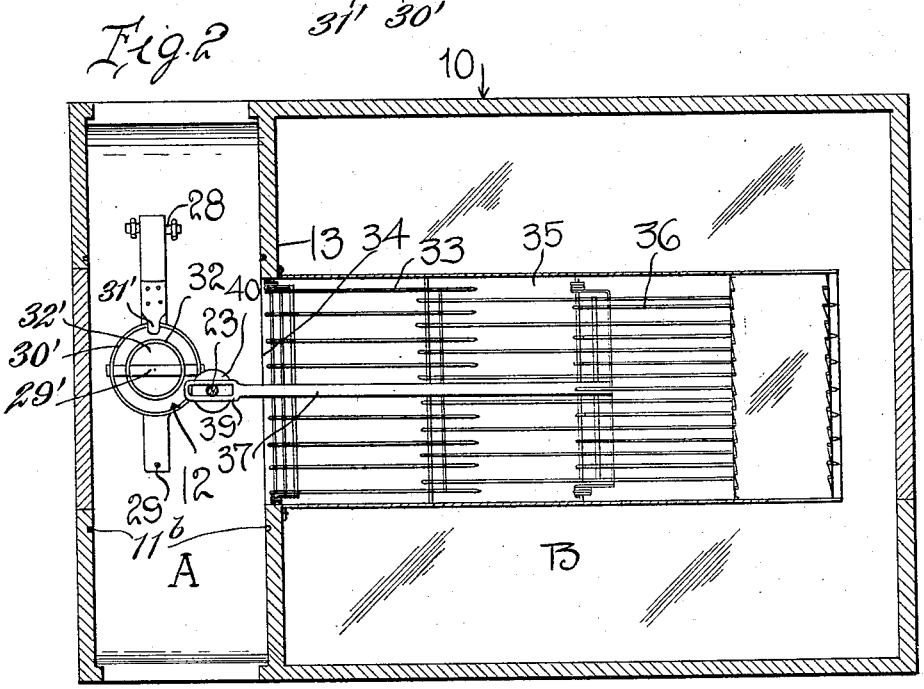

ROY H. ROBERTSON, OF HERRIN, ILLINOIS.

ANIMAL-TRAP.

1,171,657.  Specification of Letters Patent.  Patented Feb. 15, 1916.

Application filed April 21, 1915. Serial No. 22,844.

*To all whom it may concern:*

Be it known that I, ROY H. ROBERTSON, a citizen of the United States, residing at Herrin, in the county of Williamson and State of Illinois, have invented certain new and useful Improvements in Animal-Traps, of which the following is a specification, reference being had to the accompanying drawings.

The present invention relates to new and useful improvements in traps and has particular reference to those of the type employed in trapping rodents.

The principal object of the invention is to provide a trap of this character which is constructed with such regard to proportion, number and arrangement of parts that it may be cheaply manufactured and will be durable and efficient in service.

A further object of the invention is the provision of a trap in which the door, through which the rodent initially enters is adapted to be released when the rodent tampers with the bait carried by the trigger disposed within the trap.

Another object is to provide a resetting mechanism for the entrance door which is adapted to be operated by the rodent in passing from one compartment of the trap to another.

The above, and other incidental objects of a similar nature which will be hereinafter more specifically treated are accomplished by such means as are illustrated in the accompanying drawings, described in the following specification, and then more particularly pointed out in the claim which is appended hereto and forms part of this application.

With reference to the drawings, wherein there has been illustrated the preferred embodiment of this invention, as it is reduced to practice, and throughout the several views of which similar reference numerals designate corresponding parts, Figure 1 is a top plan view; Fig. 2 is a horizontal section taken on the line 2—2, of Fig. 4; Fig. 3 is a longitudinal vertical section on the line 3—3, of Fig. 1; and Fig. 4 is a transverse vertical section on the line 4—4, of Fig. 1, the bait trigger and the bracket which is associated therewith, being shown in full lines.

As embodied in the accompanying drawings, the trap preferably comprises a rectangular body casing 10, a pair of doors 11 which are located at opposite sides thereof, a bait trigger 12 which is operatively connected to the doors for releasing them when the rodent attempts to remove the bait and a resetting mechanism which is adapted to be operated by the rodent as it passes from one compartment of the casing to another.

The casing 10 is divided into two compartments A and B by a longitudinal partition wall 13. It is intended that the rodent shall have free access to the entrance compartment A, under the doors 11, which are normally maintained in open position. The doors 11 are pivoted at their upper ends and are provided adjacent their lower ends with lateral trunnions $11^a$ which are seated in the arcuate guide grooves $11^b$. Transverse recesses $11^c$ are formed in the bottom wall to receive the lower edges of the doors when the same are in closed position, so that the doors may not be swung outwardly beyond closed position and the rodents may not obtain a hold on the doors for raising them. The doors are normally maintained in elevated position by a pair of lifting rods 14 and 15 which are movable through the woven wire top wall of the casing and are pivotally connected at their upper terminals to a pair of controlling levers 16 and 17. These members 16 and 17 extend longitudinally on the casing and are pivoted intermediate their length on a pair of posts 18 and 19 which rise from a base plate 20. This latter member is substantially rectangular in shape and is provided with terminal apertures 21 through which bolts or equivalent fastening devices may pass, for securing the base plate to the top wall of the casing. In the approximate center of the base plate is formed a relatively large opening 22, through which the trigger rod indicated by the numeral 23 is vertically reciprocable. The upper terminal of this trigger rod is pivotally connected to the adjacent terminals of the levers 16 and 17.

A vertically disposed guide tube or sleeve 24 is secured to the base plate 20 to receive the plunger rod, so that this member will be maintained in vertical position at all times. In the side of this guide member is formed a relatively large opening 25 which is provided in order that the latch 26 may be engaged with the notch 27 of the trigger rod. This latch member 26 is preferably formed from a length of spring steel which is secured at one terminal to the base plate 20. The latch extends in a horizontal plane and normally tends to engage with the trigger rod. It will be apparent that when the latch is engaged in the notch of the trigger rod, this member is held in retracted position and, as a result, the levers 16 and 17 maintain the rods 14 and 15 in elevated position, whereby the doors are held in open position.

In order that the rodent may readily release the doors to permit them to swing downwardly to closed position, the trigger hereinbefore designated by the numeral 12 is pivoted on a bracket 28 secured upon the floor of the casing 10. The terminal of this trigger is connected by a cable or similar flexible element 29 to the free end of the latch 27. The cable passes over a pulley 30 which is suspended from the top wall of the casing by a bracket 31. A bait plate 32 is applied to the top of the trigger so that the bait placed thereon may not be withdrawn by the rodent. The bait plate 32 consists of an arm 29' which carries a spiral wire 30'. The wire 30' is pivoted at one side, as at 31' to the trigger so that the bait plate may be lifted from a position over the recess 32' in the trigger to permit the placing of bait therein. With the present bait plate, the bait is always exposed to the rodent's view, but is so arranged that the rodent, in endeavoring to get at it, will depress the trigger. It will be obvious that if the bait carrying terminal of the trigger is depressed by the rodent, in the act of removing the bait, the latch 27 will be withdrawn from engagement with the notch 26, allowing the trigger rod to move upwardly, whereby the doors may fall, by gravity into closed position. Thus, when the rodent has entered the compartment A and has tampered with the bait, it will be impossible for him to leave the compartment A through the doors 11. The only exit available to the entrapped rodent, is the swinging door 33 which is attached to the partition wall to close the opening 34 therein. This door 33 leads into a casing or run-way 35 which abuts at its one end against the casing wall. The inner end of the casing 35 is provided with an exit door 36, similar to the door 33. The doors 33 and 36 swing in the same direction and it will be obvious that after the rodent has entered the casing 35, through the door 33, he may not return into the casing A, through this door, but must leave the casing 35 by means of the door 36. This door 36 will be hereinafter referred to as the resetting door, since it is operatively connected to the trigger rod and is adapted, when swung upwardly, to reset this member, as will be now described.

The setting arm 37, which is rigid with respect to the door 36, leads through the partition wall and is provided at its free end with a yoke 39 which is adapted to rest upon the stop plate 40 secured to the lower end of the trigger rod. As will be seen upon reference to Fig. 2, the upward movement of the door 36 into open position will cause the swinging of the lever 37. The downward movement of the yoke of this member will, of course, be communicated to the trigger rod, throwing the same downwardly through the sleeve 24. Thus the trigger rod will be pulled downwardly until the latch 26 seats in the notch 27. The doors 11 are thus lifted into open position and the trap is again set for the next rodent.

In reduction to practice, it has been found that the form of this invention illustrated in the drawings, and referred to in the above description as the preferred embodiment is the most efficient and practical; yet realizing that the conditions concurrent with the adoption of this device will necessarily vary, it is desirable to emphasize the fact that various minor changes in the details of construction, proportion and arrangement of parts may be resorted to, when required, without sacrificing any of the advantages of this invention, as defined by the appended claim.

What is claimed is:—

An animal trap including a body casing, having alined door openings therein, swinging doors adapted to close said openings, a trigger, a trigger rod movable vertically through the top of the casing, having a notch therein, a latch normally engaged within the notch, means connecting the upper end of the trigger rod with the doors to normally retain them in an open position, means connecting the free end of the latch with the trigger, whereby to disengage the latch from the trigger rod upon actuation of the trigger to permit the doors to swing to a closed position, and means connected with the trigger rod and operable by a trapped victim for resetting the doors in open position, after they have been closed, subsequent to the entrance of the victim into the casing.

In testimony whereof I hereunto affix my signature in the presence of two witnesses.

ROY H. ROBERTSON.

Witnesses:
ALBERT K. ELLES,
FRED BEVARD.

Copies of this patent may be obtained for five cents each, by addressing the "Commissioner of Patents, Washington, D. C."